Figures 1, 2:
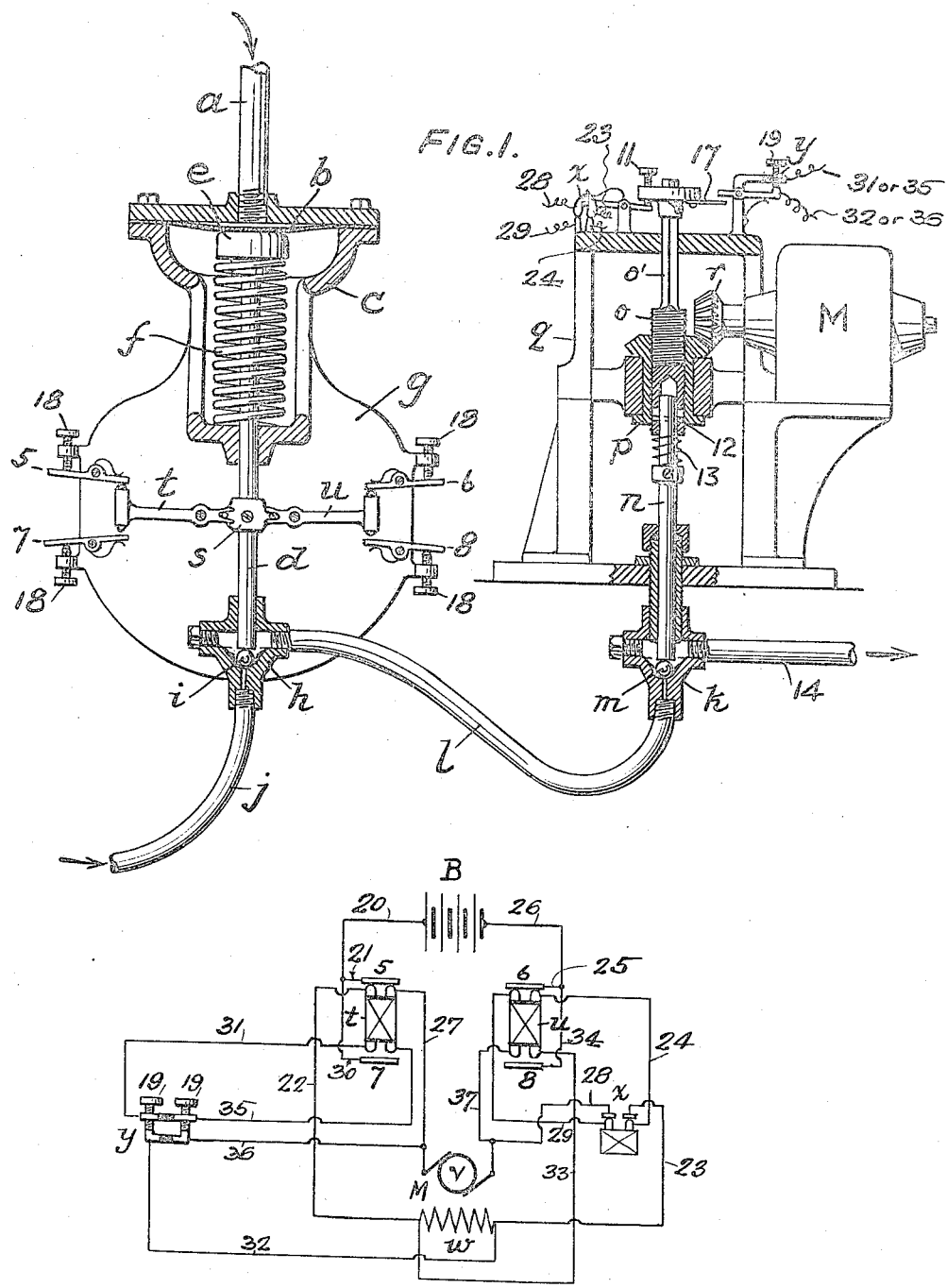

E. J. HUGO.
FUEL SUPPLY REGULATOR FOR STEAM BOILERS.
APPLICATION FILED JULY 18, 1918.

1,293,446.

Patented Feb. 4, 1919.

WITNESS:
Rob R Kitchel

INVENTOR
Emil J. Hugo
BY Frank S. Busser
ATTORNEY.

UNITED STATES PATENT OFFICE.

EMIL J. HUGO, OF PHILADELPHIA, PENNSYLVANIA.

FUEL-SUPPLY REGULATOR FOR STEAM-BOILERS.

1,293,446.  Specification of Letters Patent.  Patented Feb. 4, 1919.

Application filed July 18, 1918. Serial No. 245,580.

*To all whom it may concern:*

Be it known that I, EMIL J. HUGO, a citizen of the United States, residing at Philadelphia, county of Philadelphia, and State of Pennsylvania, have invented a new and useful Improvement in Fuel-Supply Regulators for Steam-Boilers, of which the following is a full, clear, and exact description, reference being had to the accompanying drawings, which form a part of this specification.

My invention relates to fuel control valves for steam engines, and more specifically to the automatic control of the liquid fuel supply to the burners under the small boiler used in steam automobiles.

In such machines provision is made at present for cutting off the supply of the fuel oil when the pressure in the boiler reaches a certain predetermined number of pounds per square inch. This is accomplished by allowing the steam pressure to act against a spring to press a ball valve to its seat in the fuel supply pipe, thereby cutting off the flow through the pipe.

The main difficulty with this form of valve is that as the pressure rises and the steam commences to press upon the valve, the supply is so cut down as to put out the lights at the burners, but there is a certain amount always seeping past the valve. This collects beneath the burners and in a short time is ignited by the pilot light producing what is known as a back-fire, i. e., ignition takes place in the mixing chamber below the burners. This condition obtains likewise when the high pressure commences to lower. There is a certain fluttering of the valve at these times, when the steam pressure just above balances the spring, which allows the passage of a small amount of fuel and is in consequence the cause of great uncertainty in the action of the boiler.

The object of my invention is to prevent the occurrence of this back-firing condition by insuring a tight and effective cut-off and a sudden clear-cut opening of the fuel supply at the times desired, and it may be, and preferably is, used in connection with the present valve. In this way, if, for any reason, one valve should fail to operate the fuel supply will be controlled by the other one and there will be no chance of any interruption in the automatic control of the fuel supply.

My invention is electrically operated and comprises a small motor and battery together with a ball valve similar to the valve at present in use. I will now proceed with a detailed description of an apparatus embodying my invention, in connection with the accompanying drawings, in which—

Figure 1 shows a form of apparatus, partly in section embodying my invention, and Fig. 2 is a diagrammatic view of the wiring therefor.

Referring to Fig. 1: Pipe $a$, leading directly from the steam space of the boiler, is threaded into a plate carrying a diaphragm $b$, so that as the pressure in the boiler rises the diaphragm is pressed outward from the plate. The plate and diaphragm are bolted to a housing $c$, which extends downward and forms a support for a stem $d$, whose head $e$ is confined against the diaphragm by a coiled spring $f$.

A plate $g$ depending from the housing carries a valve casing $h$, into which the end of stem $d$ extends, where it is supposed to act upon the ball-valve $i$ to close it when the steam pressure is sufficient to press down the stem against the action of spring $f$.

A pipe $j$ leads to the valve casing from the fuel supply tank (not shown). The outlet from the valve casing has heretofore been piped directly to the mixing chamber below the burners of the boiler. The parts so far described are old and well known in the art, and their operation and also the objections to their use, are as stated.

In my invention, I provide a second valve casing $k$, whose inlet is connected by a pipe $l$ with the outlet above referred to from the valve casing $h$. Casing $k$ has an outlet 14 to the burners and contains a ball-valve $m$, which is operated on by a stem $n$ projecting upward, where it is actuated from the boiler pressure in the following manner:

Stem $n$ is controlled by a screw $o$ operated by a rotatable nut $p$ carried in the frame 2, which carries valve casing $m$. Screw $o$ is prevented from turning by an extension $o'$, which is of square section and extends through a square hole in the top of frame $q$. Therefore turning nut $p$ moves screw $o$ longitudinally.

On one side of nut $p$ is formed a bevel gear, which meshes with a bevel gear $r$ on the shaft of an electric motor M, so that by revolving the motor in one direction or the other, screw $o$ is raised or lowered, and with it stem $n$. Motor M is in circuit with a battery B, and its direction of rotation is governed by means of the steam pressure in the boiler in the following manner:

Stem $d$, which is moved directly by the boiler pressure as stated, carries a collar $s$, which has pins on either side for operating two levers, $t$ and $u$, pivoted to plate $g$ on either side of the stem. The outer ends of these levers carry contacts which are connected in the circuit as will be described. Bridge pieces 5, 6, 7 and 8 are pivoted on frame $g$ in such relation to the contacts on levers $t$ and $u$ that when the steam pressure is high enough to press stem $d$ down to close valve $i$, the contacts on the upper side of lever $t$ will be electrically connected by bridge piece 5 and the contacts on the upper side of lever $u$ will be connected by bridge piece 6. Similarly, when the pressure falls sufficiently, levers $t$ and $u$ are turned and the two contacts on the lower side of each are connected by bridge pieces 7 and 8.

In the high pressure position, shown in the drawings, contacts are closed at 5 and 6, and the circuit is closed (see Fig. 2) through the battery B, wires 20 and 21, bridge piece 5, the right hand upper contact on lever $t$, wire 27, the armature $v$ of the motor, line 28, switch $x$ (hereinafter described), the left hand upper contact on lever $u$, wire 29, bridge piece 6, and wires 25 and 26 to the battery. A branch circuit is simultaneously closed through bridge piece 5, left hand upper contact of lever $t$, wire 22, field $w$ of the motor, wire 23, switch $x$, wire 24 to the right hand upper contact of lever $u$, bridge piece 6 and wires 25 and 26 to the battery. This turns the motor in the direction to move screw $o$ downwardly until stem $n$ presses ball-valve $m$ positively closed on its seat and prevents any flow of oil therethrough which might seep by valve $i$ as previously described.

In order to prevent undue strain, it is then necessary to stop the motor. To accomplish this, a spring-closed switch $x$ is placed in the circuit, which is arranged to be opened, when valve $m$ has been tightly seated, by an adjustable screw 11 carried by the extension $o'$ of the screw. To allow of the operation of this switch after the valve has been closed, stem $n$ has a slot and pin connection with screw $o$, as shown at 12, and a spring 13 is interposed between the screw and a collar on the stem stiff enough to hold the valve tight and yet allow the screw to lower further to open switch $x$.

This stops the motor and valve $m$ prevents the flow of oil to the burners until the boiler pressure has fallen to a predetermined amount, decided by the stiffness of spring $f$, whereupon this spring acts to raise stem $d$ sufficiently to make the terminals on the lower sides of the levers $t$ and $u$ contact with bridge pieces 7 and 8. The free play between these two positions, which are extreme positions of stem $d$, admits of a gradually increasing amount of oil passing valve $i$; but as valve $m$ is still held closed, none of this oil is yet allowed to enter pipe 14 leading to the burners.

When stem $d$ has moved up sufficiently to allow bridge pieces 7 and 8 to bridge their contacts a circuit is closed from the battery, wires 20 and 30, bridge piece 7, right hand lower contact on lever $t$, wire 35, switch $y$ (hereinafter described), wire 36, armature $v$, wire 37, left hand lower contact on lever $u$, bridge piece 8 and wires 34 and 26 to the battery. A branch circuit is simultaneously closed through bridge piece 7, left hand contact on lever $t$, wire 31, switch $y$, wire 32, field $w$, wire 33, right hand lower contact on lever $u$, bridge piece 8 and wires 34 and 26 to the battery. The current flows in the opposite direction through the field to the one before described and therefore rotates the motor in the opposite direction and nut $p$ is turned to raise screw $o$. This movement first takes up the compression of spring 13 until pin 12 rests in the bottom of its slot, and then raises stem $n$, furnishing the sudden, clear-cut opening of the fuel inlet desired. At the first upward movement of screw $o$ switch $x$ is allowed to spring shut, which does nothing except to insure that the circuits through wires 23 and 24 and wires 28 and 29 are in condition to be closed by a subsequent rise in pressure.

After valve $m$ has been allowed to open, the motor is brought to a stop by the switch $y$ hereinbefore mentioned. This switch is normally spring-closed, as is switch $x$, but is arranged to be opened by a projection 17 carried by the extension $o'$ of screw $o$. By this means, when stem $n$ has raised sufficiently to allow valve $m$ to fully open, projection 17 opens switch $y$ and the circuit is at once broken and all movement ceases. Adjusting screws 19 on this switch allow for setting it with regard to projection 17. Moreover, the battery is not being drained continuously, but is only active momentarily, at the extremes of boiler pressure, when the mechanism acts.

Contacts 5, 6, 7, and 8 are adjustable by means of screws 18.

Having now fully described my invention, what I claim and desire to protect by Letters Patent is—

1. An automatic fuel-supply regulator comprising a fuel supply passage, a plurality of valves therein for controlling the passage of fuel, mechanism controllable by steam pressure to control the opening and closing of one of said valves, mechanism to control the opening and closing of the other of said valves, and means operable by the first mechanism to control the operation of the second mechanism.

2. An automatic fuel-supply regulator comprising a fuel supply passage, a plurality of valves therein controlling the passage of fuel, mechanism controlled by steam pressure to control the opening and closing of one of said valves, an electric motor and means operable thereby to control the opening and closing of the other valve, and means controlled by said mechanism to control the operation of the motor.

3. An automatic fuel-supply regulator comprising a fuel supply passage, a plurality of valves therein for controlling the passage of fuel, mechanism controlled by steam pressure for operating one of said valves, a motor for operating the other of said valves, and means connected with said mechanism for controlling said motor whereby when the first of said valves is closed the second valve will also close and be retained in closed position after said first valve has partially opened.

In testimony of which invention, I have hereunto set my hand, at Philadelphia, Pa., on this 17th day of July, 1918.

EMIL J. HUGO.